(12) United States Patent
Lahaye

(10) Patent No.: US 8,846,209 B2
(45) Date of Patent: Sep. 30, 2014

(54) ALUMINIUM COMPOSITE SHEET MATERIAL

(75) Inventor: Christiaan Theodorus Wilhelmus Lahaye, Heerhugowaard (NL)

(73) Assignee: Aleris Aluminum Duffel BVBA, Duffel (BE)

( * ) Notice: Subject to any disclaimer, the term of this patent is extended or adjusted under 35 U.S.C. 154(b) by 1087 days.

(21) Appl. No.: 11/718,686

(22) PCT Filed: Nov. 10, 2005

(86) PCT No.: PCT/EP2005/012192
§ 371 (c)(1),
(2), (4) Date: Jan. 12, 2009

(87) PCT Pub. No.: WO2006/053701
PCT Pub. Date: May 26, 2006

(65) Prior Publication Data
US 2009/0214891 A1    Aug. 27, 2009

(30) Foreign Application Priority Data
Nov. 16, 2004    (EP) .................................... 04078138

(51) Int. Cl.
B32B 15/01 (2006.01)
C22C 21/06 (2006.01)
C22C 21/00 (2006.01)
C22C 21/10 (2006.01)

(52) U.S. Cl.
CPC .............. *C22C 21/06* (2013.01); *C22C 21/00* (2013.01); *C22C 21/10* (2013.01); *B32B 15/016* (2013.01)
USPC ........... 428/654; 428/650; 428/213; 428/215; 428/332

(58) Field of Classification Search
USPC .................. 428/650, 213, 332, 610, 615, 654
See application file for complete search history.

(56) References Cited

U.S. PATENT DOCUMENTS

| | | | |
|---|---|---|---|
| 3,192,752 A * | 7/1965 | Dowd et al. ........................ 72/45 |
| 3,496,620 A * | 2/1970 | Wolfe, Jr. ....................... 428/654 |
| 3,857,973 A | 12/1974 | McKee et al. |
| 5,232,788 A * | 8/1993 | Timsit et al. .................. 428/560 |
| 5,266,130 A | 11/1993 | Uchida et al. |
| 5,480,498 A * | 1/1996 | Beaudoin et al. ............. 148/549 |
| 5,616,189 A | 4/1997 | Jin et al. |
| 5,858,134 A | 1/1999 | Bechet et al. |
| 6,033,499 A | 3/2000 | Mitra |
| 6,153,854 A | 11/2000 | Haszler et al. |
| 6,224,992 B1 | 5/2001 | Delbeke et al. |
| 6,329,075 B1 | 12/2001 | Nener et al. |
| 6,337,147 B1 | 1/2002 | Haszler et al. |
| 6,495,269 B1 * | 12/2002 | Haszler et al. ................ 428/610 |
| 6,528,183 B2 | 3/2003 | Dif et al. |
| 6,780,259 B2 | 8/2004 | Bull et al. |
| 6,848,233 B1 | 2/2005 | Haszler et al. |
| 6,959,476 B2 | 11/2005 | Li et al. |
| 2002/0031682 A1 | 3/2002 | Dif et al. |
| 2003/0087122 A1 | 5/2003 | Benedictus et al. |
| 2003/0127165 A1 | 7/2003 | Magnusen et al. |
| 2004/0062946 A1 * | 4/2004 | Benedictus et al. .......... 428/654 |
| 2005/0000678 A1 * | 1/2005 | Van Der Winden .......... 164/476 |
| 2005/0011630 A1 | 1/2005 | Anderson et al. |
| 2006/0185816 A1 | 8/2006 | Anderson et al. |
| 2007/0137738 A1 | 6/2007 | Bassi et al. |
| 2009/0169917 A1 | 7/2009 | De Smet et al. |
| 2009/0202860 A1 | 8/2009 | Lahaije |
| 2009/0214891 A1 | 8/2009 | Lahaye |
| 2010/0127125 A1 | 5/2010 | Li et al. |
| 2010/0279143 A1 | 11/2010 | Kamat et al. |
| 2011/0165437 A1 | 7/2011 | Timm et al. |

FOREIGN PATENT DOCUMENTS

| | | |
|---|---|---|
| CA | 2376273 | 1/2001 |
| EP | 0326337 A1 | 8/1989 |
| EP | 0327245 A1 | 9/1989 |
| EP | 0489427 A1 | 6/1992 |
| EP | 0623462 A1 | 11/1994 |
| EP | 0946315 | 10/1999 |
| EP | 1170118 A1 | 1/2002 |
| EP | 1557260 A2 | 7/2005 |
| EP | 1852250 A1 | 11/2007 |
| FR | 2704557 A1 | 11/1994 |
| FR | 2826979 A1 | 1/2003 |
| GB | 925956 | 5/1963 |
| GB | 1004868 | 9/1965 |
| JP | 59089748 | 5/1984 |
| JP | 6228691 | 8/1984 |

(Continued)

OTHER PUBLICATIONS

International Alloy Designations and Chemical Composition Limits for Wrought Aluminum and Wrought Aluminum Alloys, The Aluminum Association, Inc., Feb. 2009.*
Feb. 24, 2011 Notice of Allowance issued in U.S. Appl. No. 12/297,302 to De Smet et al.
Final Office Action of Jul. 6, 2010 from U.S. Appl. No. 12/297,300 to De Smet et al.
Final Office Action of Sep. 15, 2010 from U.S. Appl. No. 12/297,302 to De Smet et al.
U.S. Appl. No. 12/297,302, international filing date of Apr. 19, 2007 (US National Stage of PCT/EP2007/003447, published as WO 2007/128389 on Nov. 15, 2007).
U.S. Appl. No. 12/297,300, international filing date of Apr. 19, 2007 (US National Stage of PCT/EP2007/003448, published as WO 2007/128390 on Nov. 15, 2007).
U.S. Appl. No. 12/297,293, international filing date of Apr. 19, 2007 (US National Stage of PCT/EP2007/003450, published as WO 2007/128391 on Nov. 15, 2007).

(Continued)

Primary Examiner — Mark Ruthkosky
Assistant Examiner — Daniel J Schleis
(74) Attorney, Agent, or Firm — Novak Druce Connolly Bove + Quigg LLP

(57) ABSTRACT

The invention relates to an aluminium composite sheet material in which a clad sheet is applied to at least one side of a core material. The core material has an aluminium alloy the AA5xxx- or AA6xxx-series, and the clad sheet has an aluminium alloy selected from the group of the AA1xxx-series, AA3xxx-series and AA7xxx-series with less than 1.5 wt. % of Zn.

10 Claims, No Drawings

(56) References Cited

FOREIGN PATENT DOCUMENTS

| | | |
|---|---|---|
| JP | 61049796 | 3/1986 |
| JP | 62122744 | 6/1987 |
| JP | 62122745 | 6/1987 |
| JP | S62158033 A | 7/1987 |
| JP | 63319143 | 12/1988 |
| JP | 6439340 | 2/1989 |
| JP | 5148571 A | 6/1993 |
| JP | 05-318147 A | 12/1993 |
| JP | 06-228690 A | 8/1994 |
| JP | 2000129382 A | 5/2000 |
| JP | 2004-285391 A1 | 10/2004 |
| WO | 98/24571 A1 | 6/1998 |
| WO | 9824571 | 6/1998 |
| WO | 9828130 | 7/1998 |
| WO | 0026020 | 5/2000 |
| WO | 0054967 | 9/2000 |
| WO | 0102165 | 1/2001 |
| WO | 0156782 | 8/2001 |
| WO | 0238370 | 5/2002 |
| WO | 0240210 | 5/2002 |
| WO | 03006697 | 1/2003 |
| WO | 2004/122992 A2 | 12/2004 |
| WO | 2004112992 | 12/2004 |
| WO | 2004112992 A2 | 12/2004 |
| WO | 2005049877 A2 | 6/2005 |
| WO | 2006/053701 A2 | 5/2006 |
| WO | 2007128389 A1 | 11/2007 |
| WO | 2007128390 A1 | 11/2007 |
| WO | 2007128391 A1 | 11/2007 |
| WO | 2010/126987 A1 | 11/2010 |

OTHER PUBLICATIONS

Office action of Nov. 18, 2010 from U.S. Appl. No. 12/297,302 to De Smet et al.

Notice of Allowance of Oct. 27, 2010 from U.S. Appl. No. 12/297,300 to De Smet et al.

US Published Patent Appln. No. 2004/0045643 A1, (U.S. Appl. No. 10/416,777), Hewett et al., PCT Filed Nov. 14, 2001, published Mar. 11, 2004.

Hufnagel W: "Key to Aluminium Alloys, 4$^{th}$ Edition", Aluminium-Schlüssel: Key to Aluminium Alloys, 1991, pp. 195-205, XP 002194851 Düsseldorf, Germany *p. 200-p. 202*.

Hufnagel W: "Key to Aluminium Alloys, 4$^{th}$ Edition", Aluminium-Schlüssel: Key to Aluminium Alloys, 1991, pp. 168-170, XP 002393173 Düsseldorf, Germany *p. 169-p. 170*.

Office action of Jan. 6, 2010 from U.S. Appl. No. 12/297,302 to De Smet et al.

Office action of Jan. 8, 2010 from U.S. Appl. No. 12/297,300 to De Smet et al.

Office action of Feb. 1, 2012 from U.S. Appl. No. 12/297,293 to Lahaije, filed Jan. 1, 2009.

Office action of Oct. 6, 2011 from U.S. Appl. No. 13/167,747 to De Smet, filed Jun. 24, 2011.

Office Action of Apr. 2, 2012 from U.S. Appl No. 13/167,747 to De Smet, filed Jun. 24, 2011.

Non-final Office action of May 11, 2011 from U.S. Appl. No. 12/297,293 to Lahaije.

U.S. Appl. No. 13/167,747 to De Smet, filed Jun. 24, 2011 (unpublished).

Final Office Action of Aug. 14, 2012 from U.S. Appl No. 13/167,747 to De Smet et al., filed Jun. 24, 2011.

Final Office Action of Oct. 22, 2012 from U.S. Appl No. 12/297,293 to Lahaije, filed Jan. 12, 2009.

Office action mailed Nov. 27, 2012 for U.S. Appl. No. 13/561,360 to De Smet filed Jul. 30, 2012.

"Novelis FusionTM AS 250"—for multiple automotive parts, Product Datasheet, Novelis Inc. (Aug. 25, 2008).

"Novelis FusionTM AF-350"—for automotive door inners, Product Datasheet, Novelis Inc. (Aug. 25, 2008).

MetalBulletin Glossary-definition of Clad metals, Emirates Aluminium, published by Metal Bulletin Ltd. (2010).

Online tools—Metals Glossary—Aluminium (C)—definition of Clad Material; URL: < http://www.aalco.co.uk/online-tools/glossary/aluminium/c >, retrieved from the Internet, Apr. 9, 2013.

Constellium, Glossary, definition of Clad sheet, URL: < http://www.constellium.com/alminium-company/aluminium-properties-and-uses/glossary>, retrieved from the Internet, Apr. 9, 2013.

Wilsons Aluminium Alloy—Glossary of Terms for Aluminium, definition of clad material; URL: < http:// www.wilsonsmetals.com/datasheets/Wilsons-Ltd_Aluminium-Alloy_Glossary-of-Terms-for-Aluminium_234.pdf >, p. 5, retrieved from the Internet Apr. 9, 2013.

Office action mailed Mar. 19, 2013 for U.S. Appl. No. 13/167,747 to De Smet filed Jun. 24, 2011.

Arai et al., "Heat Treating of Aluminum Alloys-Strengthening by Heat Treatment", ASM Handbook, 1991, ASM International, vol. 4, p. 1-78.

Rooy, E., "Ingot Casting Processes", ASM Handbook, 2008, ASM International, vol. 15, p. 1-8.

Official Action issued in connection with U.S. Appl. No. 12/768,429 on Feb. 9, 2012.

International Search Report from PCT/US2010/032735 dated Aug. 6, 2010.

Official Action issued in connection with U.S. Appl. No. 13/616,128 on Oct. 29, 2013.

Official Action issued in connection with U.S. Appl. No. 13/616,128 on Mar. 26, 2013.

International Preliminary Report on Patentability of Nov. 1, 2011 for PCT International Application No. PCT/US2010/032735, International Filing Date Apr. 28, 2010.

Official Action issued in connection with U.S. Appl. No. 12/297,293 on Feb. 11, 2014.

Official Action issued in connection with U.S. Appl. No. 12/297,293 on May 30, 2014.

* cited by examiner

ALUMINIUM COMPOSITE SHEET MATERIAL

This application is a §371 National Stage Application of International Application No. PCT/EP2005/012192, filed on 10 Nov. 2005, claiming the priority of European Patent Application No. 04078138.7 filed on 16 Nov. 2004.

The invention relates to an aluminium composite sheet material in which a clad sheet is applied to at least one side of a core material.

Composite materials of this type are known from the state of the art, such as from international application WO-01/02165. In such a composite material the core material (which determines by far the largest component of the composite material) mainly determines the bulk mechanical properties of the composite material, such as for example the strength thereof. The clad sheet however (which, consequently, only determines a small fraction of the composite material and thus will be of minor importance for the mechanical properties thereof) is in contact with the environment surrounding the composite material and thus will determine the chemical activity (for example to a very large extent the corrosion performance of the composite material).

As examples of aluminium composite materials according to the state of the art firstly brazing sheet (with an aluminium alloy from the AA3xxx-series as core material and an aluminium alloy from the AA4xxx-series as clad sheet), as well as sheets for aeronautical use (core material comprising an aluminium alloy from the AA2xxx-series and clad sheet typically comprising an aluminium alloy from the AA1000-series) may be mentioned. It is common for such known composite materials that they are developed for a specific use and for fulfilling specific demands.

It is noted that the above-mentioned document WO-01/02165, which represents the state of the art according to the preamble of the main claim, does not mention nor suggest specific aluminium alloys for use in a composite material, but only refers to a method for producing such an aluminium composite material (irrespective its composition).

As will be appreciated herein below, except as otherwise indicated, all aluminium alloy designations refer to the Aluminium Association designations in Aluminium Standards and Data and the Registration Records, as published by the Aluminium Association.

It is an object of the present invention to provide an improved aluminium composite material of the type referred to above, which is especially designed for use in vehicles, and as Automotive Body Sheet in particular.

Thus in accordance with the present invention there is provided an aluminium composite material in which a clad sheet is applied to at least one side of a core material, characterized in that the core material comprises an aluminium alloy from the AA5xxx- or AA6xxx-series, whereas the clad sheet comprises an aluminium alloy from the AA1xxx-series, AA3xxx-series, or AA7xxx-series with less than 1.5 wt. % Zn.

To date panels for use in vehicles (also referred to as Automotive Body Sheets or ABS) did use only a single aluminium alloy (and thus define what is referred to as uni-alloy systems). Generally, aluminium alloys from the AA5xxx-series are used for structural and inner panel applications, whereas aluminium alloys from the AA6xxx-series are used for outer panel applications. Although by varying the chemical composition of the alloys a wide variation of mechanical properties can be achieved, not all possibilities are applied in practice. For applications in vehicles these possibilities are limited, among others, due to restrictions imposed by corrosion performance. For example, an increase of the Mg-level in AA5xxx-series aluminium alloys indeed enhances the formability as well as strength, but at the same time the corrosion performance (especially the so-called intergranular corrosion) is worsened. Thus, although one would like to increase the Mg-level for improving the mechanical properties, the reduction of the chemical properties does not allow it. Likewise, in AA6000-series aluminium alloys an increase of the Cu-level (which would be beneficial for the strength-performance) would adversely lead to an increased corrosion sensitivity (especially the so-called filiform corrosion) for painted surfaces.

According to the present invention the properties of the core material are disconnected from the demands imposed on the surface of the composite material. Thus, the core material can be chosen such as to meet the mechanical demands as good as possible (meaning, in the above-mentioned examples, an increase of the Mg and Cu levels), whereas the clad sheet can be chosen such as to meet the demands on interaction with the environment. It appears, that a combination of a core material comprising an aluminium alloy from the AA5xxx or AA6xxx-series with a clad sheet comprising an aluminium alloy selected from the group consisting of the AA1xxx-series, AA3xxx-series and AA7xxx-series with less than 1.5 wt. % Zn can meet such demands.

Further, in vehicles adhesive bonding of automotive body sheets occurs, regulated by specific requirements (although not as stringent as is the case in the aeronautical field). While a uni-alloy system needed an adequate pre-treatment of its surface, it appears that the composite sheet material according to the present invention does not need so to obtain a sufficient durability.

According to an embodiment the AA5xxx-series aluminium alloy of the core has the following chemical composition, in weight percent:

| | |
|---|---|
| Mg | 3.50-5.00, preferably 4.0-4.70 |
| Mn | 0.05-0.80, preferably 0.20-0.55 |
| Zn | <0.60, preferably <0.30 |
| Fe | <0.35, preferably <0.25 |
| Si | <0.25, preferably <0.20 |
| Cr | <0.30, preferably 0.05-0.25 |
| Zr | <0.30, preferably 0.05-0.25 |
| Cu | <0.20 |
| Ti | <0.15, |
| balance aluminium and inevitable impurities, each <0.05, total <0.15. | |

This range encompasses the aluminium alloys AA5082, AA5182, AA5086, AA5186.

Whereas as an example of aluminium alloy from the AA6xxx-series the aluminium alloy AA6016 may be mentioned. Other suitable AA6xxx-series alloys are those having a Cu-content up to 1.1 wt. %, and preferably up to 0.9 wt. %, for example the AA6111-series alloy.

These alloys are extremely well-fitted for the intended use in the automobile field because of their specific properties, which per se are well known to the skilled person.

Further, it is preferred that the clad sheet comprises an aluminium alloy selected from the group of the AA1xxx-series, which includes essentially unalloyed aluminium or aluminium containing not more than 0.1 or 1% of all other elements. Aluminium alloys herein designated AA1xxx-type series include all Aluminium Association (AA) alloys, including the sub-classes of the 1000-type, 1100-type 1200-type and 1300-type. This the cladding on the core may be selected from various Aluminium Association alloys such as 1050, 1060, 1045, 11001200, 1230, 1135, 1235, 1435, 1145, 1345, 1250, 1350, 1170, 1175, 1180, 1185, 1385, 1188, or 1199. These alloys are preferred because of its advantageous chemical properties (i.e. its interaction with the surroundings) and its durability. Of these alloys the AA1050 alloy is most preferred.

In another embodiment the core is clad with an aluminium alloy from the AA7xxx-series with less than 1.5 wt. % of Zn, and which encompasses the AA7072 alloy containing 0.8 to 1.3% Zn. However, also AlZn-alloys with Zn-contents in the range 0.25 to 0.7 wt. %, and preferably 0.3 to 0.6 wt. %, provide adequate corrosion protection for the intended purpose of this invention.

Although, depending on its application, the aluminium composite material in accordance with the present invention may comprise only one clad sheet applied to only one side of the core material, preferably a clad sheet is applied to both sides of the core material. As a result, the composite material exhibits excellent balanced properties, viz. strength and formability versus corrosion performance.

Although the dimensions of the aluminium composite material can be varied in many ways (mostly imposed by the specific use and concurrent demands), in an exemplary embodiment for use as automotive body sheet the core material has a thickness in the range of 0.5 to 2 mm, preferably 0.7 to 1.3 mm, and most preferably about 1 mm. For structural application of the composite sheet the thickness may range up to 3.5 mm for the core alloy. The clad layer or layers are usually much thinner than the core, each constituting 1 to 25% of the total composite thickness. A clad layer more typically constitutes around 1 to 12% of the total composite thickness.

In a further aspect the invention relates to a method for producing an aluminium composite material in which a clad sheet is applied to at least one side of a core material. In accordance with the present invention the core material comprises an aluminium alloy from the AA5xxx- or AA6xxx-series, whereas the clad sheet comprises an aluminium alloy from the AA1xxx-series, AA3xxx-series or AA7xxx-series with less than 1.5 wt. % of Zn, and wherein the clad sheet is attached to the core material by means of roll bonding.

Such a roll bonding process is very economic and results in a very effective composite material presenting the desired properties.

Of course, the roll bonding process may be accompanied by several additional processing steps (such as for example annealing) for determining the final properties of the composite material.

When carrying out such a roll-bonding process for producing the inventive composite material, it is preferred that both the core material and clad sheet experience a thickness reduction during the role bonding.

For example the core material initially can be a 80 mm thick block (for example from aluminium alloy AA5182 or AA6016) with at both sides a clad sheet initially 5 mm thick. After roil bonding the final width of the core material was about 1 mm, whereas the final thickness of the clad layer is, for example, 40 μm.

It is noted that the initial dimensions and final dimensions of the composite material will be determined both by the specifics of the roll-bonding process as well as the required properties of the final material.

The roll bonding process can be carried out in different manners. For example, it is possible that the roll-bonding includes both hot rolling and cold rolling.

Further, the roll-bonding process may be a one-step process or a multi-step process in which during successive rolling steps the material is gauged down. Separate rolling steps then may be separated by other processing steps (for example annealing steps, heating steps, cooling steps, etc).

As expressed above, the aluminium composite material in accordance with the present invention is extremely well-fit for use as automotive body sheet in vehicles. The choice of the core material from the AA5xxx- or AA6xxx-series leads to excellent mechanical properties, which are at least comparable with standard industrial substrate alloys. Tests conducted on specimens of the inventive aluminium composite material further showed, that there is no significant correlation between the thickness of the clad sheet and the mechanical properties, thus confirming what has been stated before with respect to disconnecting the bulk properties of the core material from the demands imposed on the clad sheet.

Further, the choice of in particular an AA1xxx-series aluminium alloy as clad sheet enables to obtain an excellent performance of the composite material as regards to the environment. For example, its sensitivity for inter granular corrosion can be limited within acceptable limits; further its sensitivity for filiform corrosion, especially in combination with painted surfaces, can be reduced.

The invention is not limited to the embodiments described before, which may be varied widely within the scope of the invention as defined by the appending claims.

The invention claimed is:

1. Automotive body panel made from an aluminium composite sheet material in the form of an automotive body sheet, consisting of AA6xxx series alloy as core material, wherein the AA6xxx series alloy is an AA6016-series aluminium alloy, comprising in wt. %
Si 1.0-1.5
Fe at most 0.50
Cu at most 0.20
Mn at most 0.20
Mg 0.25-0.6
Cr at most 0.10
Zn at most 0.20
Ti at most 0.15
impurities 0.05 each, 0.15 total
balance Al, and clad sheet applied directly to at least one side of the core material, wherein the clad sheet consists of an AA3xxx-series aluminium alloy, wherein the core material has a thickness in the range of 0.7-1 mm and wherein each clad sheet has a thickness in the range of 1-12% of the total thickness of the composite sheet material, the clad sheet has been attached directly to a side of the core material by roll bonding and both the core material and clad sheet experienced a thickness reduction during the roll bonding.

2. The automotive body panel according to claim 1, consisting of the AA6016-series aluminium alloy as core material and the clad sheet applied directly to only one side of the core material.

3. The automotive body panel according to claim 1, the aluminium composite sheet material consists of an AA6016-series aluminium alloy as core material and having a clad sheet on both sides of the core material.

4. The automotive body panel according to claim 1, wherein the clad sheet has been attached to the core material by roll bonding and both the core material and clad sheet experienced a thickness reduction during the roll bonding.

5. The automotive body panel according to claim 1, consisting of
the AA6016-series aluminium alloy as core material and the clad
sheet applied directly to one said side of the core material.

6. The automotive body panel according to claim 1, consisting of the AA6016-series aluminium alloy as core material and the clad sheet applied directly to two opposed said sides of the core material.

7. The automotive body panel according to claim 1, wherein the automotive body panel is hemmed.

8. The automotive body panel according to claim 1, wherein the sheet has improved hemming performance relative to an unclad said core.

9. Method for producing an automotive body panel of claim 1 comprising:
applying the clad sheet directly to at least one side of the core material,
wherein the clad sheet is attached to the core material by roll bonding.

10. Method according to claim 9, wherein both the core material and clad sheet experience a thickness reduction during the roll bonding.

\* \* \* \* \*